US007618224B2

(12) United States Patent
Barry

(10) Patent No.: US 7,618,224 B2
(45) Date of Patent: Nov. 17, 2009

(54) STORAGE AND RETRIEVAL SYSTEM

(76) Inventor: Leonard D. Barry, 19300 Pennington Dr., Detroit, MI (US) 48221

( * ) Notice: Subject to any disclaimer, the term of this patent is extended or adjusted under 35 U.S.C. 154(b) by 218 days.

(21) Appl. No.: 11/078,066

(22) Filed: Mar. 11, 2005

(65) Prior Publication Data

US 2005/0158156 A1 Jul. 21, 2005

Related U.S. Application Data

(60) Provisional application No. 60/553,271, filed on Mar. 15, 2004.

(51) Int. Cl.
*B65G 63/02* (2006.01)

(52) U.S. Cl. ....................... 414/337; 414/338; 414/389; 414/659

(58) Field of Classification Search ................. 414/337, 414/338, 389, 392, 659, 660
See application file for complete search history.

(56) References Cited

U.S. PATENT DOCUMENTS

| | | | | |
|---|---|---|---|---|
| 3,548,756 | A * | 12/1970 | Fujioka | 105/455 |
| 3,762,588 | A * | 10/1973 | Hansen et al. | 414/666 |
| 4,189,276 | A * | 2/1980 | Shaffer | 414/659 |
| 6,619,904 | B1 * | 9/2003 | Barry | 414/337 |
| 6,652,214 | B1 * | 11/2003 | Barry | 414/337 |
| 7,014,410 | B2 * | 3/2006 | Barry | 414/337 |
| 7,121,782 | B2 * | 10/2006 | Barry | 414/337 |
| 7,438,515 | B2 * | 10/2008 | Barry | 414/338 |
| 2002/0044858 | A1 * | 4/2002 | Barry | 414/392 |

OTHER PUBLICATIONS

Article by Damian Leal entitled "Operational Excellence" from Material Handling Management Magazine dated Feb. 2005.
Advertisement from Material Handling Management Magazine, Mar. 2005.

* cited by examiner

*Primary Examiner*—James Keenan
(74) *Attorney, Agent, or Firm*—Gifford, Krass, Sprinkle, Anderson & Citkowski, P.C.

(57) ABSTRACT

This invention is an oblique fork or channel parallel moving transfer system especially for lift or stacker vehicles for storage and retrieval of containers such as automobile parking pallets, racks, parts boxes, etc. on storage shelves, platforms or racks including those having a plurality of tiers for storing the containers. It can serve as a parking garage, warehouse or other storage-retrieval system. The lift vehicle has a lift or fork bed with one or more oblique channels or forks extended to engage a line of rollers or cooperating slide member on the container to move the container out from the tier and support it when the vehicle is engaged and moved parallel to the facing side of the tier. The vehicle lifts and lowers and rolls along an aisle for transfer to and from racks on either or both sides. Two cooperating lifts columns are at opposite corners farthest from the channel for transfer clearance to and from either side. End loading ramps extend over the end of the stacker for end loading of a pallet with vehicles. The lift bed or forks can be mounted on a lift truck supported from one or both ends along one side to transfer when operated parallel along an aisle.

21 Claims, 5 Drawing Sheets

FIG. 23
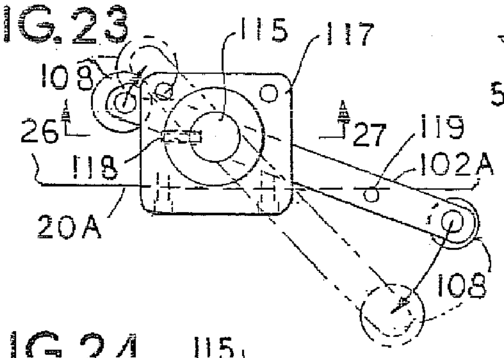
FIG. 29
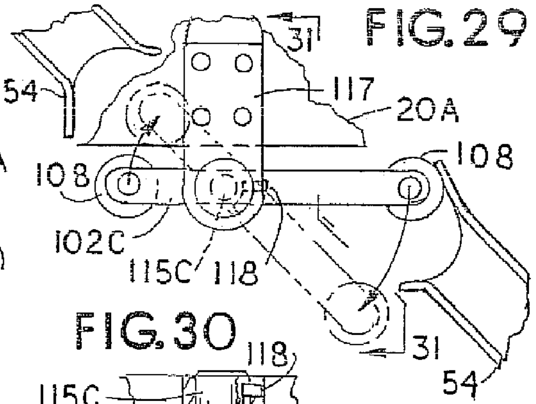
FIG. 24
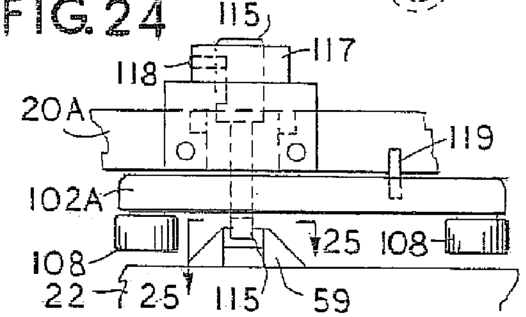
FIG. 30
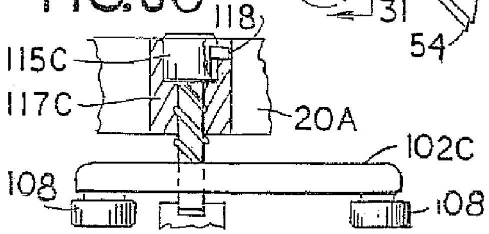
FIG. 25
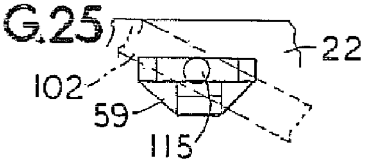
FIG. 31
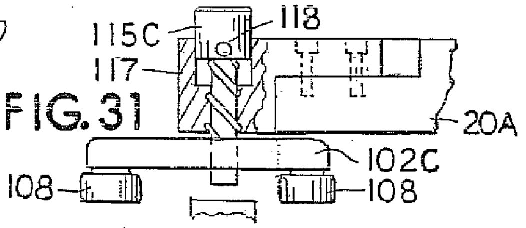
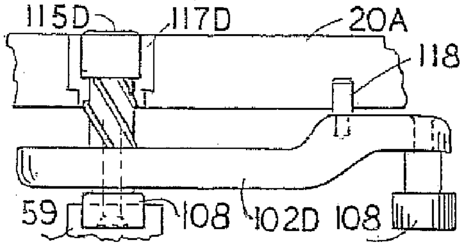
FIG. 32
FIG. 26
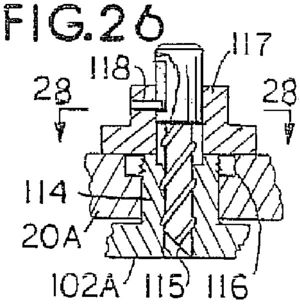
FIG. 27
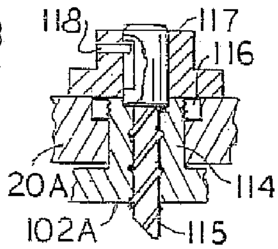
FIG. 28
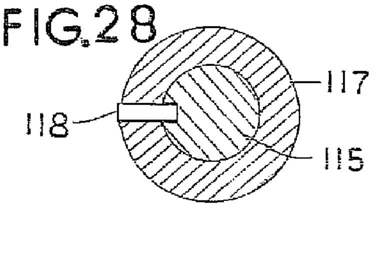
FIG. 33
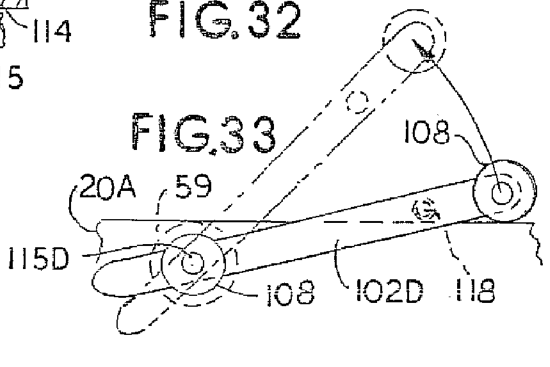

STORAGE AND RETRIEVAL SYSTEM

RELATED APPLICATIONS

This application claims priority of U.S. Provisional Patent Application Ser. No. 60/553,271 filed Mar. 15, 2004, which is incorporated herein by reference.

FIELD OF THE INVENTION

This invention is an application of my drive-by transfer to lift trucks. This invention combines an oblique channel transfer platform with a stacker or lift truck especially suited for warehouse storage and retrieval of racks, pallets, parts boxes, or other containers. The result is a reduction of aisle space needed, since the drive-by transfer eliminates need for transverse travel of forks.

BACKGROUND OF THE INVENTION

At present forks are extended from an aisle to a side to go under pallets to lift them and back out. My improvement eliminates this and reduces aisle width to the width of the container plus clearance by eliminating the need to turn a stacker in the aisle even while serving both sides of the aisle.

While lift trucks are available with forks that can be turned 90° to a side and that move out to that side and back to eliminate turning of the stacker to serve only one side of an aisle, that type is considered complex and requires stopping in alignment for operation of the fork. It is an object to eliminate that mechanism and simplify for similar applications and further to be able to transfer to either side of an aisle without turning around.

The motion of my lift truck for transfer is straight along the aisle past a storage rack where a container is thereby transferred in or out according to the direction of travel.

SUMMARY OF THE INVENTION

It is an object to provide fast transfer to or from storage by providing transfer while moving steadily in either direction.

It is an object to reduce the width of warehouse aisles.

It is an object to provide a lift truck with platform for this parallel transfer along either or both sides of the aisle without turning the vehicle to transfer along different sides of the aisle.

It is a further object to have open access above the pallet on the stacker to use a crane to load the pallet on the stacker. An end lift elevator for each end of the lift platform, preferably at diagonally opposite corners of the platform, provides overhead clearance and all sides access.

It is an object to provide loading-unloading vehicle ramps at each end of travel of the stacker for drive on-off loading of the pallet on the stacker.

It is an object to provide a simplified, dependable, low cost stacker that does not need an attendant at the storage rack location for transfer.

It is an object to provide latches that release the pallet when engaged by the lift platform for transfer from the rack.

BRIEF DESCRIPTION OF THE DRAWING

These other and further objects should be evident to those skilled in the art by studying this specification with reference to the accompanying drawings wherein:

FIGS. 23 and 24 are respectively aligned plan and side views of a preferred rotary lifting latch on the pallet of FIG. 14.

FIG. 25 is a partial bottom view of FIG. 24.

FIGS. 26 and 27 are elevation views on lines 26-27 of FIG. 23 with respectively the latch lifted and lowered.

FIG. 28 is a section on line 28-28 of FIG. 26 to larger scale.

FIGS. 29 and 30 are respectively plan and front elevations of a variation of the cam transfer arm of FIGS. 23-28.

FIG. 31 is a section on line 31-31 of FIG. 29 with arm extended.

FIGS. 32 and 33 are respectively side and bottom views of another variation of the transfer arm.

DETAILED DESCRIPTION OF THE INVENTION

Figure 1:
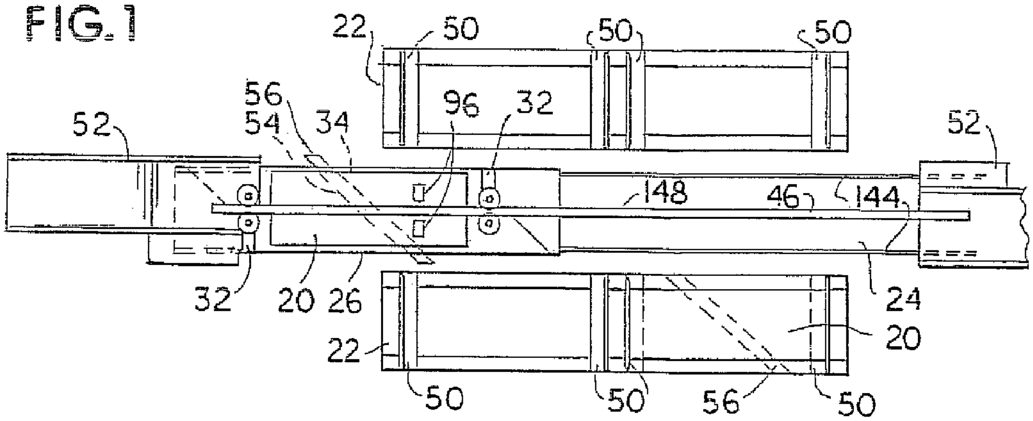
FIGS. 1 and 2 are respectively plan and side views of a parking garage or warehouse aisle with storage racks along both sides of the aisle with the stacker therein between the storage racks and end drive on-off loading ramps at ends of the aisle.

Referring to the drawings and in particular to FIGS. 1-13, containers or pallets 20 are stored each in berth on racks or shelves 22 that face along either or both sides of aisle 24 along which stacker 26 runs to place and retrieve the containers.

Figure 2:
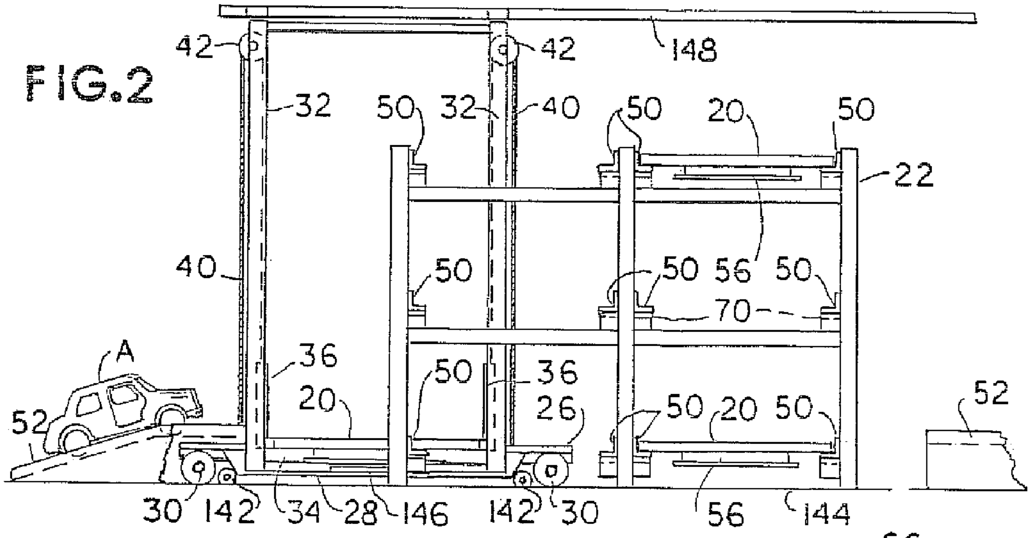
Figure 8:
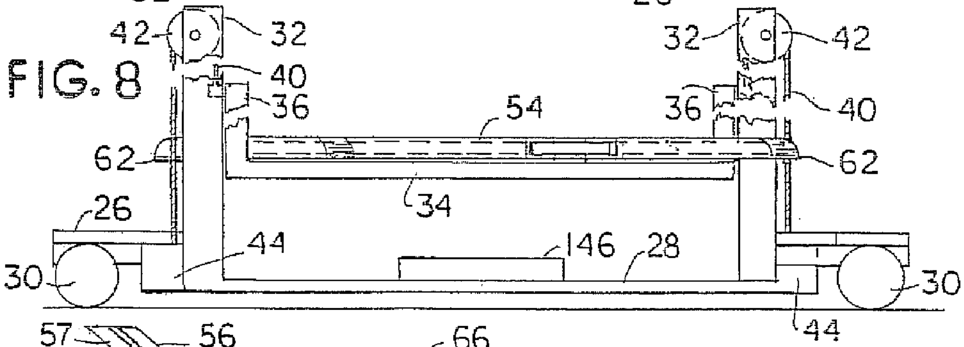
Figure 9:
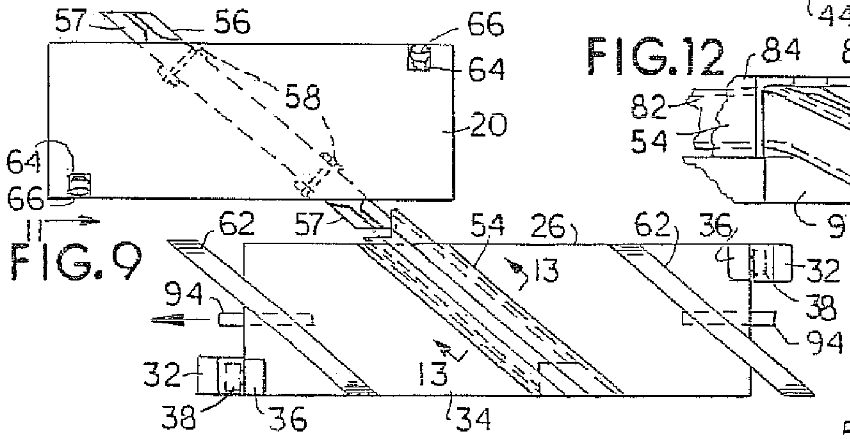
FIGS. 9 and 10 are respectively plan and side views of the platform on the stacker moving to the left to transfer the container in FIG. 9 onto the platform.

The stacker has a drop center frame 28, FIGS. 2 and 8, generally rectangular in plan supported on wheels 30 to run along aisle 24. A lift column 32 is secured extending up vertically from two diagonally opposite corners of its drop center. The stacker has a lift platform 34 which runs up and down on the vertical track on columns 32. The two diametrically opposite corners of platform 34 at columns 32 have a vertical tracking member 36 secured to the platform with shoes or rollers 38 engaged to travel the vertical track of column 32, FIGS. 9 and 10. A chain or cable 40 is connected to the top of each member 36 and run up and over a sprocket 42 at the top of the vertical column and down to a lifting device 44 coordinated to lift and lower the platform level. The stacker is driven or moved along the aisle in either direction by any suitable means such as cable drive 46. The platform is stopped and held at the correct levels for transfer by any suitable controls. The racks have angle slides or roller ways 50 turned bottom legs in to support the pallets to slide or roll in and out or slip fit between these angle supports which can have sliding faces with plastic wear strips or coating for low friction.

The ground level tier of berths can be accessed for drive on-off vehicle loading of the pallets, or a ramp 52 at each end of the aisle can be provided for loading and unloading of a pallet when on the load platform. The ends of the stacker run under ramps 52, as shown for the left end in FIGS. 1 and 2, to bring a pallet on the stacker to the ramp.

Platform 34 has one or more oblique transfer channels 54 secured on top and extended out beyond the sides of the platform each to engage and guide an oblique runner 56 secured across the bottom of pallet 20 at the oblique angle. Runners 56 are I-shaped in section with end latch sections 57 hinged on pins 58 to drop and latch over a catch 59 on the rack to hold the pallet in until lifted by the transfer channel 54. The ends 57 of runners 56 are cut tapered parallel to the side of the pallet so the coupling overlap can be small to engage with channel 54 when extended a small amount. Transfer channels 54 are run at preferably 45-50° from the sides and in the direction toward the corners opposite the lift tacks 36 so the pallet can travel the oblique channel off and on from either side while remaining parallel to the platform. Parallel supporting rails 62, also on the oblique angle, are secured on top of the platform to support the pallet to slide or roll thereon.

The pallet has a transfer starter arm 64 with roller 66 near the two opposite corners farthest from the runners or runner 56. Arms 64 are mounted on longitudinal pins 67 in pockets 68 to swing up as in FIGS. 5 and 11 and down as in FIGS. 3 and 6 to extend their rollers 66 below the pallet in line to engage the inner edge of the support track 50 on the rack for the pallet. Arms 64 are set back from diagonally opposite leading corners, those near columns 32, to clear member 36 and columns 32 so the pallet can be transferred to or from either side without shortening the pallet or lengthening the stacker.

Figure 3:
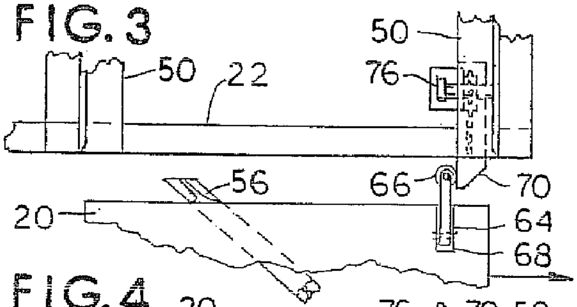
FIGS. 3 and 4 are plan and side views of the far edge of a pallet on the stacker moving to the right engaging a tab arm on the pallet with an empty rack to transfer the pallet to the rack.
Figure 5:
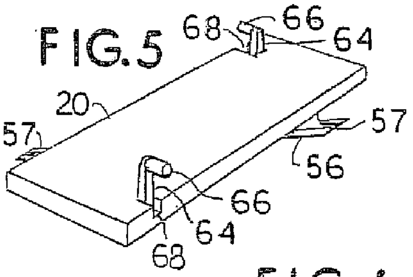
FIG. 5 is a perspective view of a pallet.
Figure 4:
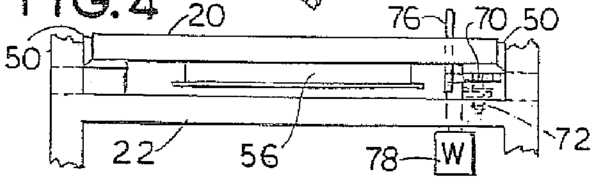
Figure 6:
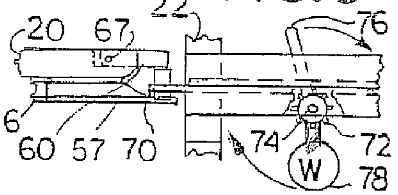
FIG. 6 is an end elevation view of FIGS. 3 and 4.
Figure 7:
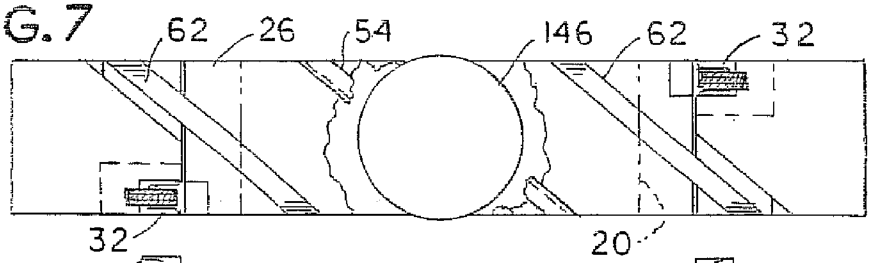
FIGS. 7 and 8 are respectively plan and side views of the stacker.
Figure 19:
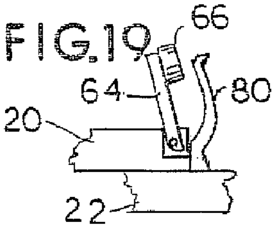
FIG. 19 is an elevation on line 19-19 of FIG. 14.
Figure 16:
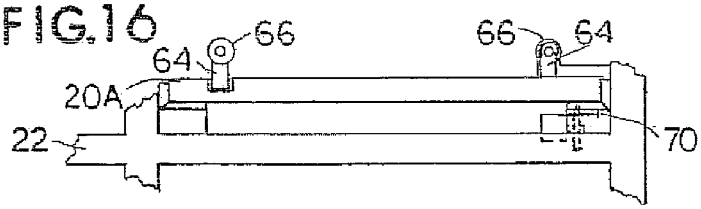
FIG. 16 is a side view on line 16-16 of FIG. 14.
Figure 20:
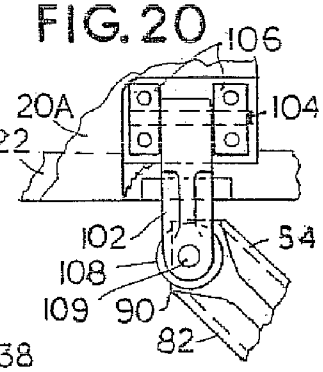
FIGS. 20-22 are respectively plan, front, and side views of a variation of cam roller arm found in FIG. 14 to larger scale.
Figure 17:
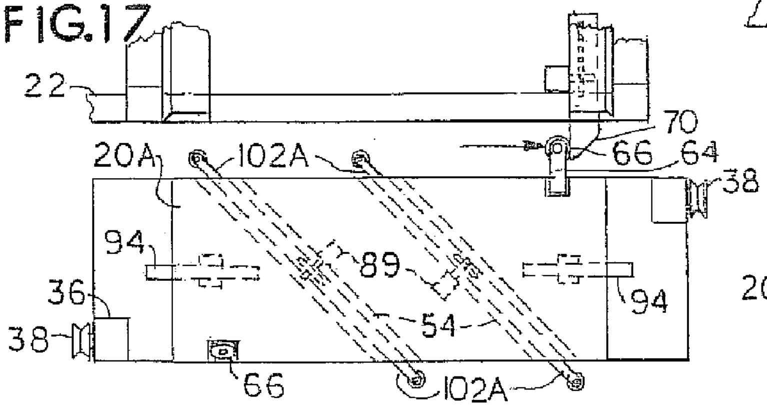
FIG. 17 is a plan view of the end of the storage rack with container on the stacker being moved to the right to transfer thereto.
Figure 21:
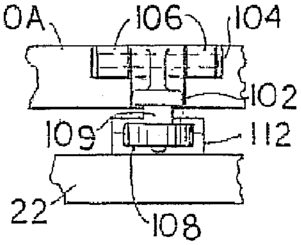
Figure 18:
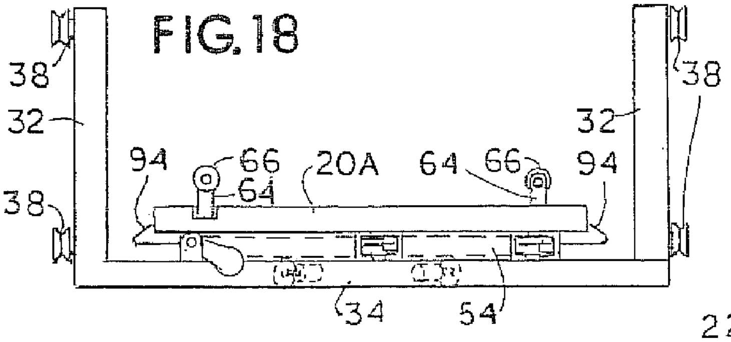
FIG. 18 is a side elevation of FIG. 17.
Figure 22:
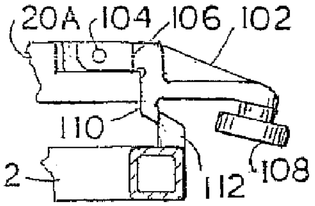

Referring to FIGS. 3, 4, and 6, arm 64 is pushed down before the pallet is sent to an empty rack. The rack has a tongue or tab 70 extended to engage roller 66 when the rack is empty to push the pallet back off from the platform and into the rack. Tab 70 slides out and in along a horizontal slot and is moved by a sprocket 72 having teeth engaging in holes along tab 70. Sprocket 72 is secured on shaft 74 with a lever arm 76 extended up to be turned down by a pallet on the rack. Lever 76 extends down below shaft 74 with weight 78 to normally hold the lever upright and the tab extended. When the pallet enters the rack from the aisle it turns lever 76 down rotating sprocket 72 to pull tongue 70 in so the stacker will not try to put a pallet in a loaded rack. Arm 64, FIG. 19, is lifted by cam 80 on the rack to swing up past vertical to stay up and remain up for retrieval so as not to reenter a rack until after the arm 64 is reset out.

Referring to FIGS. 9-13, ends of oblique runner, I-beam 56, extend out from pallet 20 to engage channel 54 when extended on the lift platform from either side. Channel 54, FIG. 13, has a tubular rectangular inner channel 82 with top slotted open central to capture runner 56 to slide therein. Channel 82 is slip-fit between holding channels 84 and 85 and positioned along these holding channels by rack and pinion gearing 88 driven by gearmotor 89 to extend out either end of channel 54 to engage the oblique I-beam runner 56 on the bottom of pallet 20 to engage and pull the pallet out of the rack onto the platform when moving along the aisle at the correct height.

Figure 12:
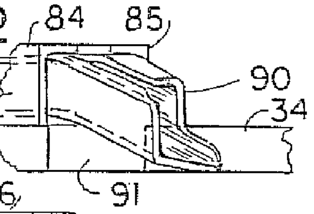
FIG. 12 is a side view of the end of the oblique channel extended on the stacker to transfer a container thereto at a larger scale.
Figure 13:
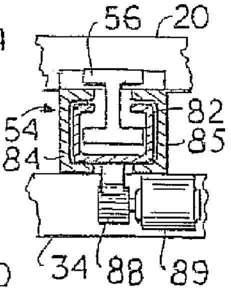
FIG. 13 is a section on line 13-13 of FIG. 9 to larger scale.
Figure 10:
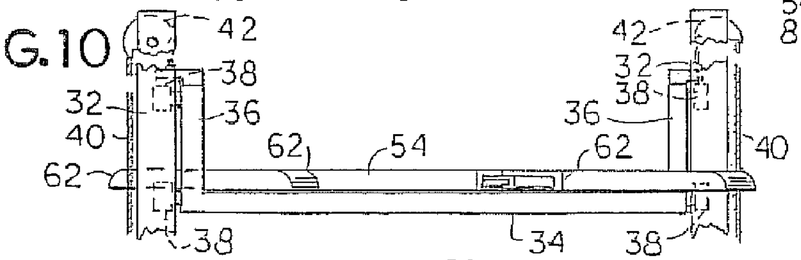
Figure 11:
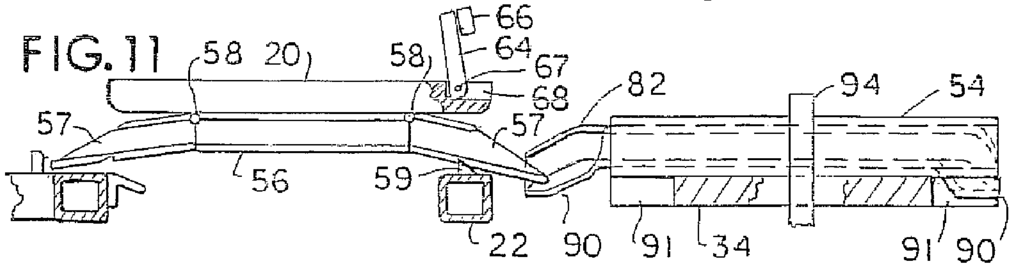
FIG. 11 is an end view in the direction of arrow 11 in FIG. 9 to larger scale.
Figure 14:
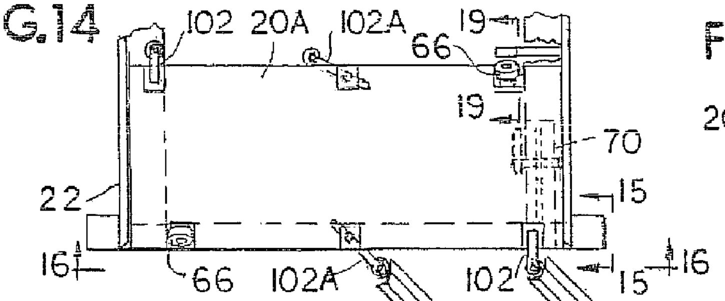
FIG. 14 is a plan view of a variation of the load platform moving to the left engaging a container for transfer thereto.
Figure 14:
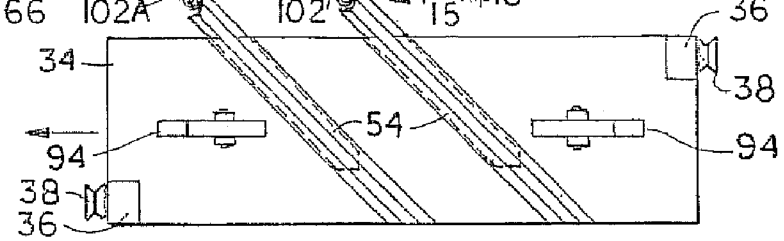
Figure 15:
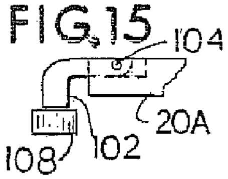
FIG. 15 is an end elevation of the pallet on lines 15-15 of FIG. 14 showing an extended fixed cam roller arm.

Inner channel 82 has a scoop 90, FIG. 12, at each end to lift latch 57 before entering into channel 54 to unlatch the pallet from the rack before pulling it onto the stacker. The web of channel 82 at the scoop slopes down on the end to lift latch 57 and recesses into a pocket 91 in the platform when retracted by gearmotor 89. The leading leg of channel 82 is bent around and extended down along the side of the platform, and the rear leg of channel 82 extends straight to push tongue 57 after it is lifted by the slope web of the channel. The top and web of tongues 57 are cut back to increase clearance to clear under the horizontal entry tabs 70 on racks 22.

The platform 34 has latches 94, FIGS. 9, 11, 16 and 17, for catching on opposite ends of the pallet when centered on the platform to prevent the pallet from sliding off either side until an arm 64 is lowered for transfer and engaged with a tab 70 at an empty berth to push the pallet hard enough to depress the latch to let the pallet pass to the rack.

Operation

An empty pallet on stacker 26 in FIG. 1 is in position for receiving a load such as auto A driven up ramp 52 onto pallet 20 on stacker 26 until its end wheels drop into shallow pockets 96 to hold it. Arm 64 is lowered to the far side of the aisle for the rack to be put in an empty rack on that side of the aisle. The stacker is moved along the aisle and its platform set to a height to engage arm 64 with an empty rack (one with tab 70 extended). When arm 64 meets a tab 70 the pallet is held while the stacker continues to travel to the right pushing the pallet onto the aligned rack. To put the pallet in a near-side rack, the opposite arm 64 is lowered before leaving the loading ramp and the stacker driven to the right and then back to an empty berth where the arm's roller 66 engages a tab 70. To retrieve a stored pallet, gearmotor 89 shifts channel 82 out to the side to engage the hinge tongue 57 on the pallet and the stacker driven to lift the tongue, unlatching it and entering it into channel 82. Channel 82 pushes on runner 56 pulling out the pallet from the rack over end latch 94 and onto the platform until clear of the rack moving until stopped by the end latch 59 on the leading end.

Variations

Like parts are given the same number or suffixed where modified.

Referring to FIGS. 14-22, the preferred pallet 20A has bottom cleared of I-beam runner 56. Pallet 20A has two transfer arms 102 or 102A hinged mounted along each transfer side. Arm 102, FIGS. 15 and 20-22, are each mounted on a longitudinal pin 104 between pillow blocks 106 recessed into the top of the pallet to be lifted up to stay up past vertical or lowered to extend out for transfer. Each arm 102 or 102A has a cam roller 108 on pin 109 depending from its outer end each to align in one of two spaced apart parallel oblique channels 54 which run across the top of lift platform 34A in the same direction as and replacing the one on platform 34. The arms when extended hold rollers 108 to align each in a channel 54 which runs to guide the pallet parallel in alignment on the platform. Arm 102 has an integral latch 110 depending between pin 104 and roller 108 to engage a catch 59 on the front of the rack.

Channels 54 are secured obliquely across the top of platform 34 and have inner extendable or telescoping channels 82 with end ramps 90 aligning to engage and lift rollers 108 together to unlatch the pallet from the rack and pull rollers 108 into both channels 54 simultaneously. The stacker, racks, and pallets are otherwise as described in FIGS. 1-3. Operation is similar except the inner channels 82 lift both rollers 108 simultaneously instead of just one channel lifting one tongue 57.

Referring to FIGS. 23-28 for details of the preferred transfer arm 102A applied to pallet 20A, the arm has a vertical integral pivot tube 114 with a steep internal spiral spline with a latch pin rod 115 with an external spline slip-fit in the internal spiral spline. Tube 114 extends slip-fit through a housing or pallet 20A and has a threaded collar 116 supporting arm 102A to revolve horizontally below the pallet. Latch rod 115 slides up and down through arm 102A, tube 114, and housing 117 secured to the top of the pallet. A vertical key slot in rod 115 is engaged by pin 118 through the housing 117 to limit vertical travel of and prevent rotation of rod 115, FIGS. 26-28. Arm 102A is a slot runner pivoted on its threaded latch rod 115 to turn horizontally and extends to support a cam roller 108 on each end to engage in channel 54 coming at it from front or rear. The two rollers 108 hold alignment of the arm with channels 54 during transfer. When arm 102A is engaged by a channel 54 it is turned out into alignment in the channel, lifting its latch pin to release the pallet for transfer. Pin 119 extends up from arm 102A to engage the front of the pallet in retracted position of the arm.

A variation of the arm 102C, shown in FIGS. 29-31, is a runner to travel the open top slot in channel 54 and has a pivot latch pin 115C extending therethrough. Pin 115C has a steep external spiral spline extending up through housing 117C with internal spline to slip fit with pin 115C to turn with arm 102C and lift both the latch and arm when engaged from front or rear by a channel 54. Latch pin 115C is supported on a ledge in housing 117C and has a wide slot engaged by pin 118 secured in a hole in housing 117C to limit vertical and angular movement of the arm. Arm 102C is pivoted off center between end cam rollers 108. The shorter length of arm extends back to enter a channel 54 coming from behind. Latch pin 115C is the arm's pivot shaft secured to turn with the arm and rotates the arm as it drops to retracted position, FIGS. 29 and 30. Rotation of arm 102C is limited by pin 118 to about 45° from the position in FIG. 29 out from the pallet to align its rollers 108 to the oblique angle of channels 54, lifting the arm and latch on its spline to enter a channel 54.

Referring to FIGS. 32 and 33 for another variation of arm 102, arm 102D is longer to guide pallet 20 along a channel 54. Arm 102D partially extends into channel 54 to be a slot runner extended out from its pivot spiral lift post 115D and extends above and beyond the runner part to the forward roller 108. Arm 102D has a second optional roller 108 on its pivot to align in channel 54. The outer extension of arm 102D runs above channel 54 so the arm can turn into alignment before its runner fully engages into the channel slot. Arm 102D is a lift arm similar to arm 102C and rotates by gravity to the position of FIG. 33 after each transfer to latch its roller on its pivot behind a catch 59.

Figure 34:
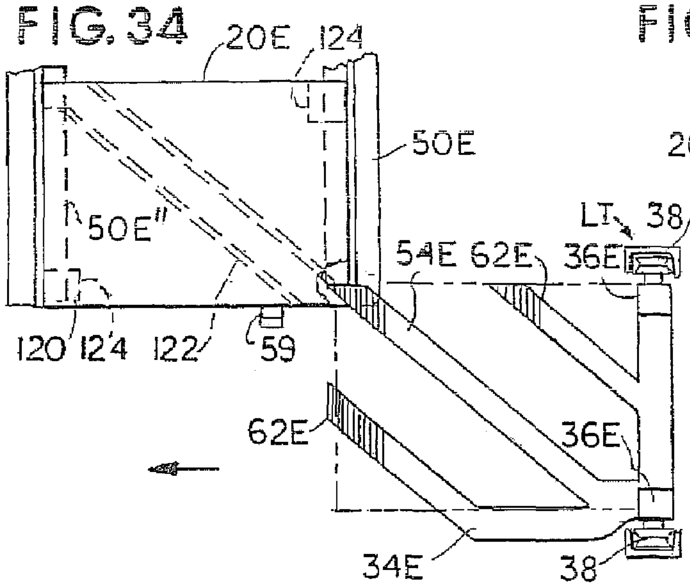
FIGS. 34 and 35 are respectively plan and side views of an oblique fork on a lift truck moving to the left about to engage a container with the fork.
Figure 35:
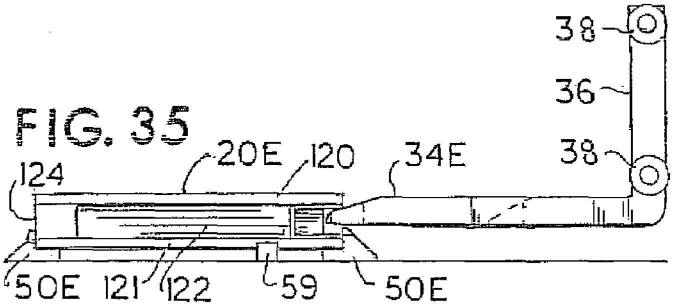

Referring to FIGS. 34-35, pallet 20E has a rectangular top plate 120 and aligned bottom plate 121 connected by a diagonal rectangular tube 122 and an open space between corner supports 124. A standard fork lift truck LT has an oblique fork 34E replacing its straight forks. Fork 34E has a main tine 54E positioned horizontally obliquely for guiding into tube 122 and a side fork 62E parallel to the oblique fork on each side all run together on the near side forming a horizontal platform 34E. Platform 34E has vertical arms 36E for fitting in the standard lift members of the fork truck with a standard lift arrangement. Pallet 20E is supported on a low friction plastic extrusion 50E secured to the rack or floor along each end to guide its in and out movement.

Figure 37:
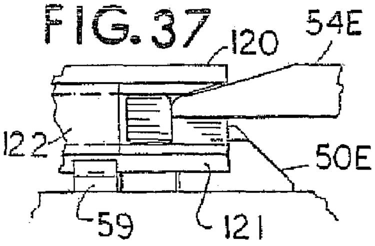
FIGS. 37 and 38 are partial end elevations of the container being engaged by the forks of FIGS. 34 and 35 to larger scale.
Figure 38:
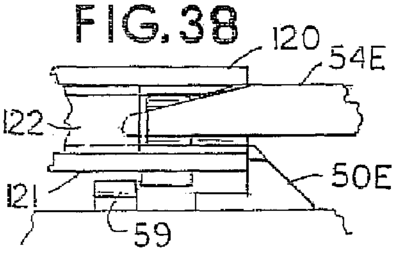
Figure 39:
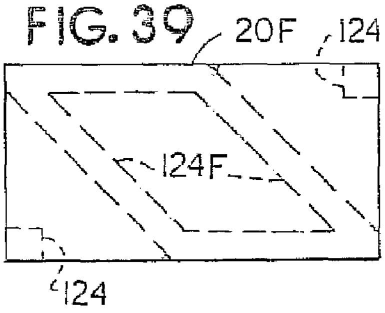
FIG. 39 is a plan view of a container with two oblique channel tunnel tubes.
Figure 40:
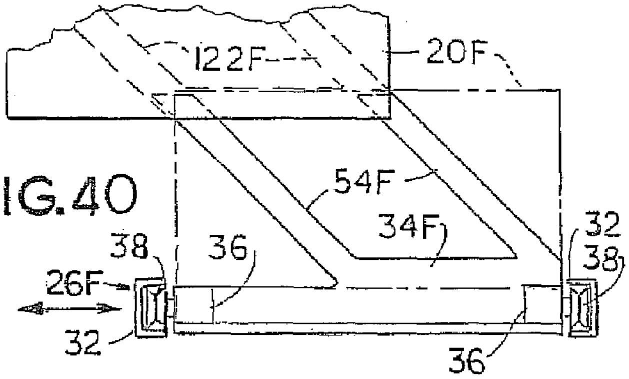
FIGS. 40, 41, and 42 are respectively plan, side, and end views of a two-column loader with load fork with portion of the container of FIG. 39 in phantom.
Figure 41:
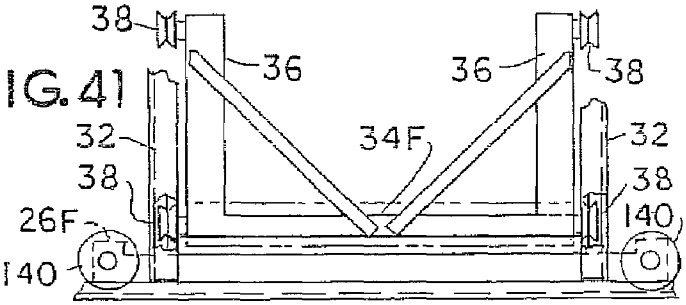
Figure 42:
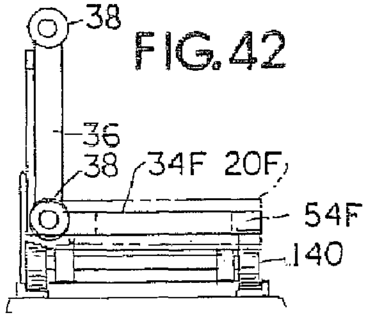

To pick up the container 20E with fork platform 34E moving to the left in FIGS. 34 and 35, center tang 54E enters tube 122, lifting the pallet as in FIGS. 37-38 to unlatch it before pushing against the far wall of tube 122, pulling the pallet straight out onto fork 34E. To place the container in its berth, fork 34E is moved to the right at a height to catch the right-hand bottom edge of pallet 20E on the strip 50E, which holds it as the fork is pulled to the right lengthwise the berth, leaving the pallet as in FIG. 34. Fork trucks so equipped can load and return pallets 20E from racks 22 along either side of the aisle according to the direction the fork truck is turned to run along the aisle.

Figure 36:
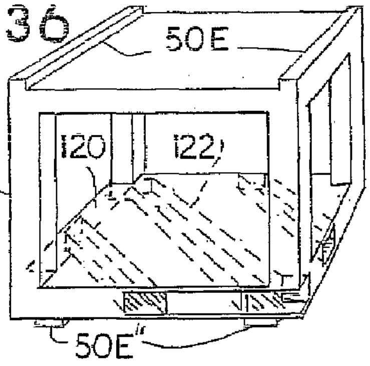
FIG. 36 is an oblique view of the container of FIGS. 34 and 35.

Referring to FIG. 36 the pallet can be stackable with a frame 20E' to protect the load and be self stackable. Strips 50E" run straight across the bottom in from the ends and strips 50E' along the ends at the top all secured on frame 20E' to key the pallets together lengthwise. Pallet 20E' is otherwise like 20E having tube 122 with an open entry for the engaging tang 54E of fork 34E to enter as in FIGS. 37 and 38.

Referring to FIGS. 39-42, stacker 26F can have one or more lift columns 32 on one side and a fork platform 34F with two parallel oblique forks 54F each to enter a parallel oblique tube 122F on pallet 20F to enter and pull the container onto the forks. Lift platform 34F has one or more vertical columns 36 each to run on a column 32 to be lifted and lowered in the usual way.

If necessary these stackers can be stabilized from tipping sideways by retractable rail wheels 140 to support it on rails 144 along the aisle, and/or by gyroscope 146, or by an overhead track 148, FIGS. 1 and 2. The force of pushing a pallet into a rack is in part countered by the load being moved off center on the platform, causing a force in the opposite direction. These stackers do not extend a load all the way lifted off to the side but rest the load on the rack during most of the transfer, all but when the pallet is nearly centered on the platform. The racks should be braced against sideways forces the stacker could offer.

Having thus described some embodiments and applications of my invention these are not intended as a limitation on the scope of this invention which is intended to cover all variations, applications, and parts within its true spirit and scope.

The invention claimed is:

1. In combination: a vehicle having a platform, said platform including a transfer guideway secured on top of said platform at an oblique angle to the forward line of travel of said vehicle, a pallet having guide means secured on its bottom to guide on and along said transfer guideway at said oblique angle to the forward line of travel of said vehicle, a berth having storage ways, at least one for supporting and guiding each end of said pallet to travel at right angles to the line of travel of said vehicle while driving past said storage ways, a catch secured to said berth at said storage ways and latch means on said pallet for dropping behind said catch for securing said pallet on said storage ways, said latch means being lifted by horizontal movement of said transfer guideway against said latch means to lift said latch means to release said pallet to be pulled along said storage ways by said transfer guideway out onto said platform while said vehicle is moving straight past said storage ways with said platform aligned to engage said transfer guideway and transfer said pallet from said storage ways onto said platform, said transfer guideway having a fork on said platform with a tapered end to engage in said guide means and lift said latch means to release said pallet to move out from said catch and pull it to move it out along said storage ways onto said platform.

2. A combination as in claim 1, said latch means including a tongue hinged to said guide means to move up and down on said guide means on said pallet to be lifted to release said pallet so it can be moved out from said storage ways onto said platform.

3. In a combination as in claim 1, said transfer guideway having an incline plane scoop at its outer end that lifts said latch means, said latch means being a transfer arm hinged to said pallet to drop down at an angle to be lifted by said incline scoop to release said pallet to move on said storage ways and out onto said platform.

4. In combination as in claim 1, said latch means being a cam roller arm mounted on said pallet to extend out to align for engaging in and moving along said transfer guideway, said arm being hinge mounted to swing up and down on said pallet and to extend out along one side of the pallet, a cam roller on the outer end of said arm on a substantially vertical axis below the pallet to engage in said transfer guideway, said latch means depending from said arm between said hinge pivot and said roller to catch on said catch to hold said pallet from moving off the transfer side of the storage ways until said roller is lifted by said transfer guideway for transfer of the pallet to said platform.

5. A combination as in claim 1, said transfer guideway being a fork for mounting on said vehicle, said vehicle being a fork lift truck and said pallet cooperating therewith, said fork having tangs run at an oblique angle from one side to the opposite side of the fork truck forming said platform for said pallet, said guide means on said pallet having top and bottom members and being an oblique tunnel with open ends for said fork to enter and pull said pallet onto said fork when moved along with the fork side to said pallet.

6. In a combination as in claim 5, said storage ways supporting ends of said pallet to move straight therealong, said fork having a tang tapered to enter said tunnel and lift said pallet over said catch as it enters said tunnel, for transfer of said pallet over said catch onto said fork.

7. In a combination as in claim 1, said guide means being a runner secured across the bottom of said pallet for aligning with said transfer guideway, said guide means including ends on said runner hinged to slope down when dropped by gravity to latch when said pallet is fully inserted to hold said pallet on said storage ways, said transfer guideway being a channel having an extended end sloped down to engage under the dropped end of said runner to lift the end of said runner to unlatch the pallet from the storage ways before pulling it out along the storage ways onto said platform.

8. In a combination as in claim 1, further comprising an extendable tab for each said berth and means to extend said extendable tab to indicate that that berth is empty, a push-off arm mounted on said pallet to be extended out to engage an extended said extendable tab to push said pallet off of said platform onto the aligned empty storage ways.

9. In a combination as in claim 8, an end stop latch on each end of said platform to stop the pallet therebetween, each said stop Latch being pivotally mounted to said platform and weighted to operate by gravity to hold said pallet on said platform except when the pallet is forced back as by said push-off arm engaging a said extendable tab.

10. In a combination as in claim 1, said guide means being a runner secured across the bottom of said pallet for aligning and travel on said transfer guideway, said latch means including hinged ends on said runner to drop down and latch on said berth which supports a said pallet, said transfer guideway being a channel having an extended end sloped down on the end to lift either of the hinged ends to unlatch the pallet from the storage ways before pulling it out onto said platform when moving past the said storage ways the pallet is on.

11. In a combination as in claim 1, a starter arm on said pallet and a vacant storage spot indicator and control comprising an extendable tab mounted to move along the said storage ways for a said pallet, rack and gear means for extending said tab, a lever weighted to be substantially vertical and secured to said gear means to rotate said gear means, said lever being positioned to be engaged by said pallet on said storage ways to turn said lever to turn said gear means to retract said tab when said pallet is occupying said storage ways, said indicator being extended to be engaged by said starter arm when extended to start entry of a said pallet onto said storage ways.

12. In a combination as in claim 1, said outer end of said transfer guideway having a scoop with an inclined plane, said latch means being mounted to swing down by gravity, to be lifted by the engaging of said incline plane of said scoop to unlatch and lowered by gravity to latch said pallet on its supporting said storage ways.

13. In a combination as in claim 1, said guide means including a transfer arm, said latch means including a vertical latch pin spirally keyed to be turning in a vertical hole and be moved up and down, means for holding said latch pin from rotation on said pallet, said transfer arm being mounted to revolve on said latch pin, said arm and pin slip fit together by a steep spiral spline for said latch pin to slide up and down on the pallet for said arm to lift said latch pin when said arm is rotated in one direction, the extended outer end of said transfer guideway engaging said arm to rotate it to lift said latch pin to clear said catch before pulling said arm into said transfer guideway.

14. In a combination as in claim 13, said latch pin being liftable to an unlatched position independent of the rotary position of said transfer arm said latch pin having a tapered bottom end so as to lift and drop to latch even when the arm is stationary.

15. In a combination as in claim 1, said latch means being a transfer arm having cam means for engaging in and moving along said transfer guideway and a vertical pivot hole with internal spiral spline upright in said pallet, a latch pin having a spline mating slip fit in said hole and secured to said arm to be rotated though the acute angle between latched position and lifted position of said latch pin, said latch pin being lifted by this rotary turning of said arm whereby said arm lifts said latch pin when turned out by said cam means engaging in said transfer guideway.

16. In a combination as in claim 1, said latch means being a rotary lift latch for side transfer coupling of a pallet with a berth for said pallet, said latch including a cam arm pivotally mounted on a vertical axis to said pallet, a steep ramp spline on said vertical axis for lifting said arm when said arm is rotated out said pallet to an angle for transfer, said latch being lifted by rotation of said arm to unlatch before the arm pulls the container.

17. In a combination as in claim 1 said guide means being at least one standing I-beam run at an oblique angle across the bottom of said pallet and having hinged ends extending out beyond said pallet to be lifted to unlatch said pallet when engaging in said transfer guideway around the bottom portion of said I-beam.

18. In a combination as in claim 1, said vehicle being a container stacker having a drop-center frame and parallel sides for transfer of said pallet, lift columns at diagonally opposite corners of the drop center frame, providing a vertical lift for said lift platform mounted between said columns to be lifted substantially level thereon, said transfer guideway comprising transfer channel means secured obliquely across the top of said lift platform, an aisle for said stacker to operate along, racks having said storage ways for storing said pallet along each side of said aisle, said pallet having said guide means to move parallel across said platform guided on said transfer guideway and straight transverse ends on said pallet to move along said storage ways on either side of said aisle, starter arm means on diagonally opposite corners of said pallet extendable to engage said racks to push said pallet from said platform onto any of the said racks having room for the pallet, and means for extending said transfer channel means for selectively engaging a said pallet to transfer to said stacker from either side of said aisle, said pallet being free to be passed across said platform to a rack on either side.

19. In a combination as in claim 1, further comprising a container, said pallet being its base.

20. In a combination as in claim 1, further comprising additional latch means on said lift platform to secure said pallet in place on said lift platform.

21. In a combination as in claim 1, said pallet being said latch means by latching over said catch and being lifted and moved over said catch by the horizontal movement of said transfer guideway against said guide means on said pallet.

* * * * *

UNITED STATES PATENT AND TRADEMARK OFFICE

CERTIFICATE OF CORRECTION

PATENT NO. : 7,618,224 B2
APPLICATION NO. : 11/078066
DATED : November 17, 2009
INVENTOR(S) : Leonard D. Barry It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 231 days.

Signed and Sealed this

Nineteenth Day of October, 2010

David J. Kappos
*Director of the United States Patent and Trademark Office*